Aug. 4, 1936.                F. ACTON                2,049,792
                SUPPORTING MEANS FOR AUTOMOBILE HEATERS
                    Filed July 30, 1934          2 Sheets-Sheet 1

Inventor
Frank Acton
By W. S. McDowell
Attorney

Aug. 4, 1936.   F. ACTON   2,049,792
SUPPORTING MEANS FOR AUTOMOBILE HEATERS
Filed July 30, 1934   2 Sheets-Sheet 2
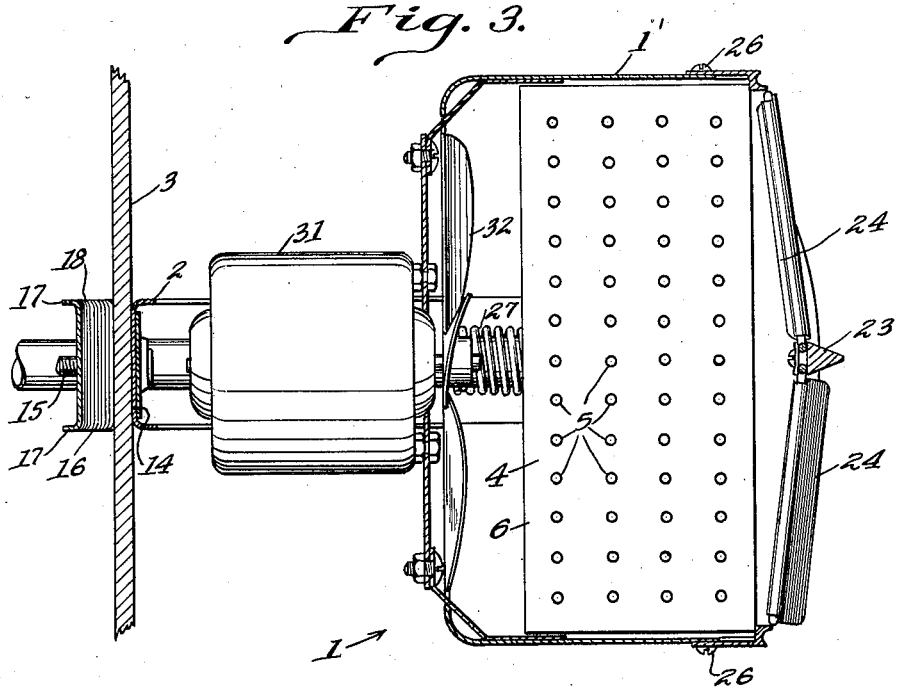
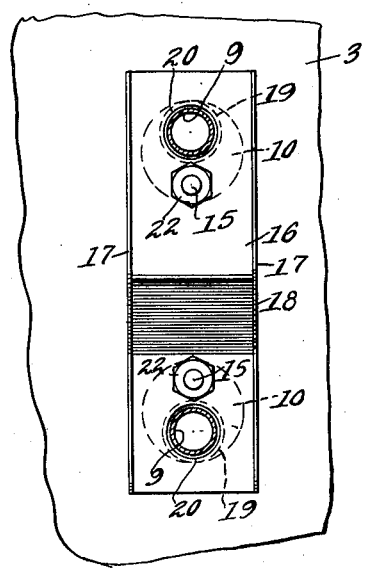
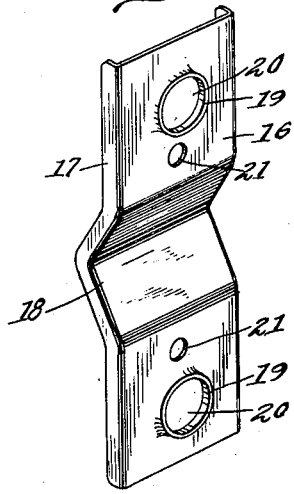
Inventor
Frank Acton
By W. S. McDowell
Attorney Patented Aug. 4, 1936

2,049,792

UNITED STATES PATENT OFFICE 2,049,792

SUPPORTING MEANS FOR AUTOMOBILE HEATERS

Frank Acton, Columbus, Ohio, assignor to Francisco Auto Heater Company, Columbus, Ohio, a corporation of Ohio Application July 30, 1934, Serial No. 737,623

4 Claims. (Cl. 248—2)

This invention relates to improvements in automobile heaters, and has particular reference to heaters of the type which utilize the liquid cooling medium of an internal combustion engine as their source of heat. Such heaters comprise a housing or casing which is usually mounted on the dash or cowl bulkhead of a motor vehicle and has positioned therein a radiator unit connected by pipes with the water circulating system of an associated engine, and wherein the housing is further provided with a motor driven fan by means of which air may be positively forced through the radiator unit to remove heat from the exterior surfaces of the radiator unit and to deliver the resultant heated air to the passenger compartment of the vehicle body.

It is a primary object of the present invention to provide an improved mounting for the housing, and the parts contained therein, of such a heater wherein facility is obtainable in the installation of the heater in connection with a motor vehicle, so that the installation may be made conveniently, quickly and accurately and the housing and its internal parts supported so that shock and vibration will not be apt to injure or interfere with the operation and construction of the heater.

For a further understanding of the invention, reference is to be had to the following description and the accompanying drawings, wherein:

Fig. 3 is a transverse sectional view thereof;

Fig. 4 is a vertical sectional view on the plane indicated by the line IV—IV of Fig. 2;

Fig. 5 is a detail perspective view of the mounting plate.

Figure 1:
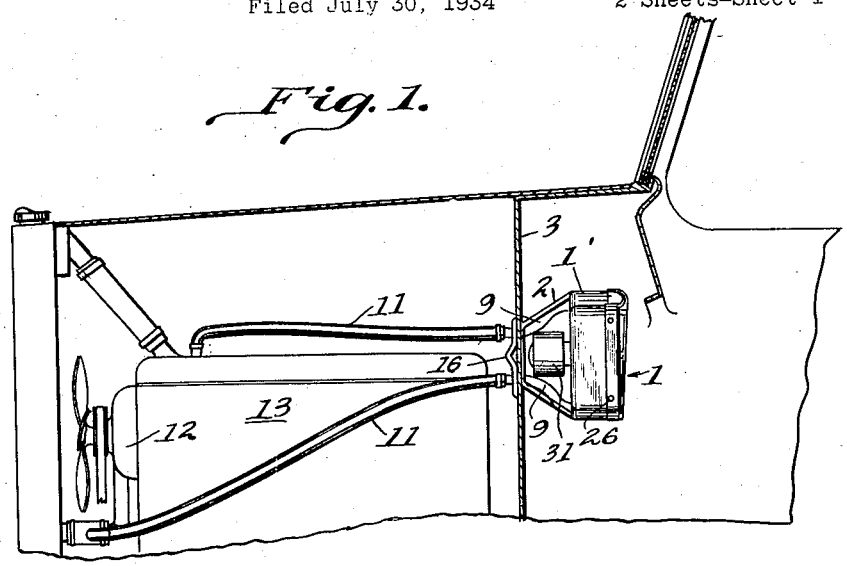
Fig. 1 is a view in vertical section of an automobile disclosing a heater, formed in accordance with the present invention in an applied position in connection therewith.

Referring more particularly to the drawings, the numeral 1 designates an automobile heater of the so-called "hot water" type. This heater comprises, in the present form of the invention, a housing 1', preferably formed from stamped sheet metal and having projecting from the rear thereof a rigid yoke 2 by means of which the housing, and the parts carried thereby, are adapted to be connected with the dash or cowl bulkhead 3 of the motor vehicle. Within the housing 1', there is disposed a radiator section 4 which includes a plurality of vertically extending tubes 5 and horizontally disposed fins 6. The upper and lower ends of the tubes 5 are connected with water inlet and outlet manifolds 7 and 8 respectively. Said manifolds are connected with sections of curvilineal metallic tubing 9 which pass through openings 10 formed in the bulkhead 3 and in advance of the bulkhead, the ends of the tubings 9 are connected with flexible conduits 11, one of which is connected with the suction side of the engine water pump 12 and the other with the top of the engine cylinder head, as indicated in Fig. 1. This construction, as usual, allows heated water, or other equivalent liquid medium, to pass from the engine, indicated at 13, into the manifold 7, thence downwardly through the radiator section 4 to the outlet manifold 8 and, thence, to be withdrawn from the manifold 8 and returned to the suction side of the pump 12 for re-circulation through the cooling passages or water jackets of the engine 13.

The present invention provides for the simple and convenient mounting of a hot water heater of this type in connection with the bulkhead 3. This bulkhead may vary in cross sectional thickness in accordance with the materials from which it is made. Frequently, the same are formed from sheet metal which may or may not be coated with a layer of a heat insulating material, or again, such bulkheads are often formed from wood. It is important, therefore, since heaters of this type are applied to automobiles as accessories following their manufacture, that a sturdy, simple and easily applied means be provided for securely mounting such a heater in its applied or operative position.

Figure 2:
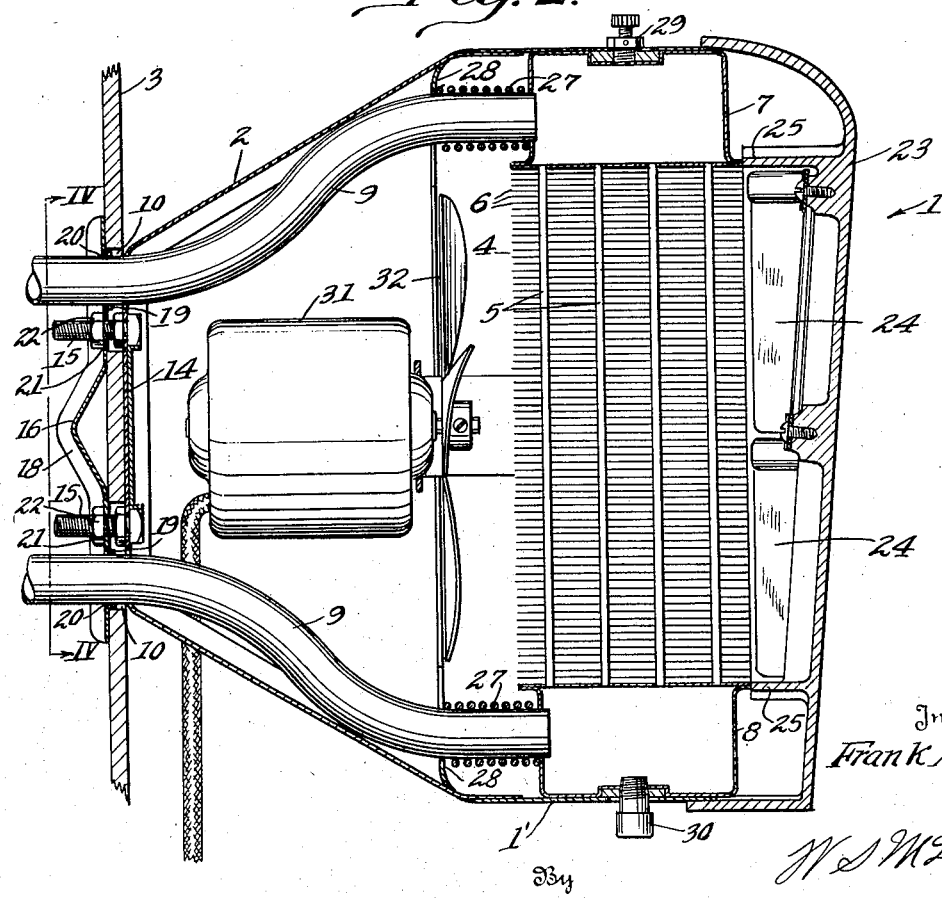
Fig. 2 is a vertical longitudinal sectional view taken through the heater and its mounting.

I accomplish this by providing the mechanic who installs the heater with a stencil or similar form of blank (not shown) which is placed on the bulkhead to permit the openings 10 to be drilled, bored or otherwise formed therein at exactly the proper relative spacing and of required diameter. This is the sole alteration which it is necessary to make in the construction of the motor vehicle to apply the heater. The tubing sections 9 are then forced through the openings 10 and the vertical wall 14 of the yoke 2 is brought into contact with the front wall of the bulkhead 3, as disclosed in Fig. 2. The wall 14 is provided with a pair of fixed non-rotatable threaded bolts or studs 15 which extend in parallel relationship and are relatively spaced so that the threaded shanks thereof will lie within or project through the openings 10.

In connection with this structure, I employ a metallic clamping plate 16, which is also preferably formed from a metallic stamping and includes vertical marginal ribs 17, a substantially V-shaped central area 18 and outstanding bosses 19 around the openings 20 through which the tubing sections 9 pass. By reference to Fig. 2, it will be noted that the bosses 19 are so disposed that they will engage with the walls of the openings 10 and this engagement is assured by the fact that the shanks of the studs 15 project through openings 21 in the clamping plate and are exteriorly provided with clamping nuts 22 which, when tightened, draw the clamping plate into firm frictional contact with the outer wall of the bulkhead 3 and cause the bosses 19 to enter the openings 10 of the bulkhead so that in addition to the frictional connection, the said bosses will serve to prevent vertical movement of the heater relative to the bulkhead. It will be noted also that to install the heater, it is merely necessary to form the openings 10 in the bulkhead since all other mounting parts of the heater will pass through these openings without requiring any further alteration of vehicle parts.

The housing includes a front frame 23 which effects the support of independently adjustable deflector plates 24 so that heated air delivered from the heater may be directed as desired in the passenger compartment of the vehicle body. The frame 23 includes a horizontally extending marginal wall 25 which engages with the forward edges of the manifolds 7 and 8, so that when the frame 23 is finally secured to the housing by means of screws 26, the said manifolds 7 and 8 and the radiator section 4 will be forced rearwardly against the influence of coil springs 27. These springs surround the ends of the tubing sections 9 where the latter join with said manifolds and the ends of said springs are positioned in contact with the stationary wall 28 of the housing and the adjoining walls of the manifolds 7 and 8. By this construction, looseness or rattle within the heater is prevented and silence in its operation secured.

The inlet manifold 7 may be provided with the usual valve 29 for governing air escape from the heater system, while the outlet manifold may be provided with a drain connection 30. The housing 1 also effects the support of an electric motor 31 which drives a fan 32 by means of which a forced travel of air through the radiator section is obtained so that the air advanced by the fan may be heated by contact with the heated exterior surfaces of the radiator section and delivered to the passenger compartment at a required temperature.

In view of the foregoing, it will be seen that the present invention provides an automobile heater of the so-called "hot water" type wherein provision is made for effecting the ready and simply executed mounting of the heater in its installed position within a motor vehicle body. This is accomplished by the mere drilling or boring of but two openings in the dash or cowl bulkhead. These openings will accommodate the water circulating conduits of the heater and also the threaded fastening elements used in connecting the heater frame or housing with the bulkhead. Again, by the provision of the clamping plate 16 and the bosses 19 formed in connection therewith, the major stress and strain imparted to the heater when in use is absorbed by the heater housing, the plate 16 and the bulkhead 3, thereby avoiding damage or injury to the radiator section or to the tubes employed in conducting water to and from the same.

What is claimed is:

1. Supporting means for automobile heaters comprising a heater frame formed with openings for the reception of fluid circulating pipes, threaded studs projecting from said frame contiguous to said openings and positioned within a pair of vertically spaced openings formed in the dash bulkhead of a motor vehicle body, the openings in said bulkhead being of sufficient diameter to receive said water circulating pipes and threaded studs, a clamping plate engaged with said bulkhead in opposed relation to said frame, said plate being provided with openings for the passage of the fluid circulating pipes and with other openings for the reception of the shanks of said threaded studs, and nuts provided upon said shanks for maintaining said clamping plate and said frame in firm frictional engagement with the opposite sides of said bulkhead.

2. Supporting means for automobile heaters of the hot water type comprising a heater carried frame, said frame being provided with spaced openings through which the water circulating pipes of the heater project, threaded studs extending rigidly from said frame contiguous to said openings and positioned within a second set of vertically spaced openings formed in the dash bulkhead of a motor vehicle body, said bulkhead openings being of sufficient diameter to receive said water circulating pipes and threaded studs, a clamping plate engaged with said bulkhead on the opposite side of the latter with respect to said frame, said plate being provided with openings for the reception of said studs and a second set of openings for the reception of said water circulating pipes, nuts engaging with the threaded ends of said studs for maintaining said plate and heater frame in frictional clamping relationship with the opposite sides of said bulkhead, and rigid positioning means formed in connection with said plate and engageable with the openings in said bulkhead to preclude vertical movement of said plate and associated heater frame relative to said bulkhead.

3. Supporting means for automobile body heaters of the hot water circulating type comprising: a heater carried frame having a vertical wall arranged to engage with the inner vertical surface of a dash bulkhead of a motor vehicle body, a clamping plate arranged to engage with the opposite surface of said bulkhead in registration with the heater frame, said heater frame, bulkhead and clamping plate being provided with registering openings for the reception of heater water circulating pipes, securing means uniting said heater frame and clamping plate to said bulkhead, and rigid positioning members engageable with the walls of the bulkhead openings for precluding vertical movement of said heater frame and clamping plate relative to said bulkhead.

4. Supporting means for automobile heaters of the water circulating type comprising: a heater carried frame arranged to engage with the dash bulkhead of a motor vehicle body, said bulkhead being provided with but two vertically spaced openings for heater mounting, a clamping plate arranged to engage with said bulkhead on the opposite side of the latter as regards said heater frame, spaced pairs of openings formed in said heater frame and said clamping plate in registration with the openings in said bulkhead, water circulating pipes for said heater projecting through the openings in said heater frame, bulkhead and clamping plate, heater clamping means engaged with the openings in said heater frame, bulkhead and clamping plate, and rigid positioning bosses integrally formed with said plate and projecting inwardly from the openings provided in said plate for the reception of the water circulating pipes, said bosses being received within the openings of said bulkhead to preclude relative vertical movement between said plate and said bulkhead.

FRANK ACTON.